United States Patent
Tsai et al.

(10) Patent No.: US 9,149,783 B2
(45) Date of Patent: Oct. 6, 2015

(54) DEVICE FOR PRODUCING ETHOXYLATION DERIVATIVES

(71) Applicant: Xiamen Ju Sheng Mechanical Engineering Co., Ltd., Xiamen (CN)

(72) Inventors: I-Min Tsai, Xiamen (CN); Kun Li, Xiamen (CN); Xiaobin Wang, Xiamen (CN); Yanzhen Huang, Xiamen (CN); Kechang Li, Xiamen (CN); Weiming Wu, Xiamen (CN)

(73) Assignee: XIAMEN JU SHENG MECHANICAL ENGINEERING CO., LTD., Xiamen (CN)

( * ) Notice: Subject to any disclaimer, the term of this patent is extended or adjusted under 35 U.S.C. 154(b) by 0 days.

(21) Appl. No.: 14/164,866

(22) Filed: Jan. 27, 2014

(65) Prior Publication Data
US 2014/0212342 A1   Jul. 31, 2014

(30) Foreign Application Priority Data

Jan. 28, 2013   (CN) ...................... 2013 2 0047463 U

(51) Int. Cl.
*B01J 19/18* (2006.01)
(52) U.S. Cl.
CPC ...................... *B01J 19/18* (2013.01)
(58) Field of Classification Search
CPC ....................................................... B01J 19/18
USPC .............. 422/198, 130, 600, 603, 604; 137/1, 137/340, 594; 423/652, 650, 659
See application file for complete search history.

(56) References Cited

U.S. PATENT DOCUMENTS

| | | | |
|---|---|---|---|
| 5,674,956 A * | 10/1997 | Nakamoto et al. | 526/88 |
| 6,180,728 B1 * | 1/2001 | Fanelli | 526/62 |
| 2009/0149626 A1 * | 6/2009 | DeBruin et al. | 528/300 |
| 2009/0326283 A1 * | 12/2009 | Franzen et al. | 568/867 |

* cited by examiner

*Primary Examiner* — Walter D Griffin
*Assistant Examiner* — Huy-Tram Nguyen
(74) *Attorney, Agent, or Firm* — Rabin & Berdo, P.C.

(57) ABSTRACT

A device for producing ethoxylation derivatives includes an assistant circulation loop with lower starting quantity is added on the base of the main circulation loop, and the assistant circulation pump is started first when slight chain initial dose is added with low flow rate of the ethylene oxide and high growth rate of polyreation; when the amount of reactant gets to the starting quantity of the main circulation pump, the main circulation loop is started with high flow rate of ethylene oxide. The two circulation loops cooperate with each other shorten reaction time and high yield in one batch; a pre-reaction cavity with smaller inner diameter than that of the main body of the reactor is extended from the bottom of the main body of the device, so that lower chain initial dose can start the assistant circulation pump, and then start the assistant circulation loop.

12 Claims, 1 Drawing Sheet

DEVICE FOR PRODUCING ETHOXYLATION DERIVATIVES

FIELD OF THE INVENTION

The present invention relates the chemical equipment field, more particularly to a device for producing ethoxylation derivatives.

BACKGROUND OF THE INVENTION

The device for producing ethoxylation derivatives at the prior comprises a reactor with a vacuumizing pipe, an evacuation pipe, a nitrogen input pipe, a chain initial dose feed inlet, an ethylene oxide feed inlet and circulation loop. A certain amount of chain initial dose is needed to start the circulation pump of the circulation loop of ethoxylation reaction, if the amount of the chain initial dose is little, the starting quantity of the circulation pump is low, and then only small circulation pump, small size of connecting pipe and the heat exchanger with low thermal load are needed, and the adding flow rate of ethylene oxide is relatively low, although this kind of setting is provided with very high growth rate, the reaction time is long and the output of the device is low. If the adding flow rate of ethylene oxide is enhanced, big circulation pump, big size of connecting pipe and the heat exchanger with high thermal load are needed, meaning large amount of chain initial dose, this kind of setting is provided with short reaction time, high output, increased cost of chain initial dose and low growth rate.

SUMMARY OF THE INVENTION

The object of the present invention is to offer a device for producing ethoxylation derivatives with high yield and high growth rate, which overcomes the defects at the prior art.

The technical proposal solving the technical matter in the present invention is:

A device for producing ethoxylation derivatives, comprises:

A reactor, comprising a main circulation feed inlet, a main circulation feed outlet at the bottom of the reactor, a vacuumizing pipe, an evacuation pipe, a nitrogen input pipe, a chain initial dose feed inlet, an ethylene oxide feed inlet and a stirring device arranged in the reactor, valves are arranged on the vacuumizing pipe, the evacuation pipe, the nitrogen input pipe and the main circulation feed outlet respectively;

A main circulation heat exchanger, comprising a first feed inlet and a first feed outlet;

And a main circulation pump;

The main circulation feed outlet is communicated with the first feed inlet of the main circulation heat exchanger through the main circulation pump, the first feed outlet of the main circulation heat exchanger is communicated with the main circulation feed inlet of the reactor;

An assistant circulation feed inlet is arranged on the reactor, and an assistant circulation feed outlet is arranged at the bottom of the reactor, and a valve is arranged at the assistant circulation feed outlet, and comprises:

An assistant circulation heat exchanger, comprising a second feed inlet and a second feed outlet;

And an assistant circulation pump with lower starting quantity than the said main circulation pump;

the assistant circulation feed outlet of the reactor is communicated with the second feed inlet of the assistant circulation heat exchanger through the assistant circulation pump, and the second feed outlet of the assistant circulation heat exchanger is communicated with the assistant circulation feed inlet of the reactor.

In a preferred embodiment, the reactor comprises a main body, and a pre-reaction cavity with smaller inner diameter than that of the main body is extended from the bottom of the main body; the main circulation feed outlet and the assistant circulation feed outlet are both arranged at the bottom of the pre-reaction cavity.

In a preferred embodiment, the stirrer device comprises a stirring shaft with a main stirring paddle and an assistant stirring paddle, and the main stirring paddle is arranged in the main body of the reactor, and the assistant stirring paddle is arranged in the pre-reaction cavity.

In a preferred embodiment, a catalyst inlet pipe with a valve is arranged at the pipe between the assistant circulation feed outlet of the reactor and the assistant circulation pump.

In a preferred embodiment, a neutralizer inlet pipe with a valve is arranged at the pipe between the main circulation feed outlet of the reactor and the main circulation pump.

In a preferred embodiment, a product outlet pipe with a valve is arranged at the pipe between the main circulation pump and the first feed inlet of the main circulation heat exchanger.

In a preferred embodiment, the valves are automatic valves.

Compared with the technical proposal at the prior, the benefits of the present invention are:

1 An assistant circulation loop with lower starting quantity is added on the base of the main circulation loop, and the assistant circulation pump is started first when slight chain initial dose is added with low flow rate of the ethylene oxide and high growth rate of polyreation; when the amount of reactant gets to the starting quantity of the main circulation pump, the main circulation loop is started with high flow rate of the ethylene oxide, the two circulation loops are cooperating with each other to get shorter reaction time and high yield in one batch;

2 A pre-reaction cavity with smaller inner diameter than that of the main body of the reactor is extended from the bottom of the main body of the present invention, so that lower chain initial dose can start the assistant circulation pump, and then start the assistant circulation loop to assure the safe and steady running of the assistant circulation.

DESCRIPTION OF THE PREFERRED EMBODIMENTS

Figure 1:
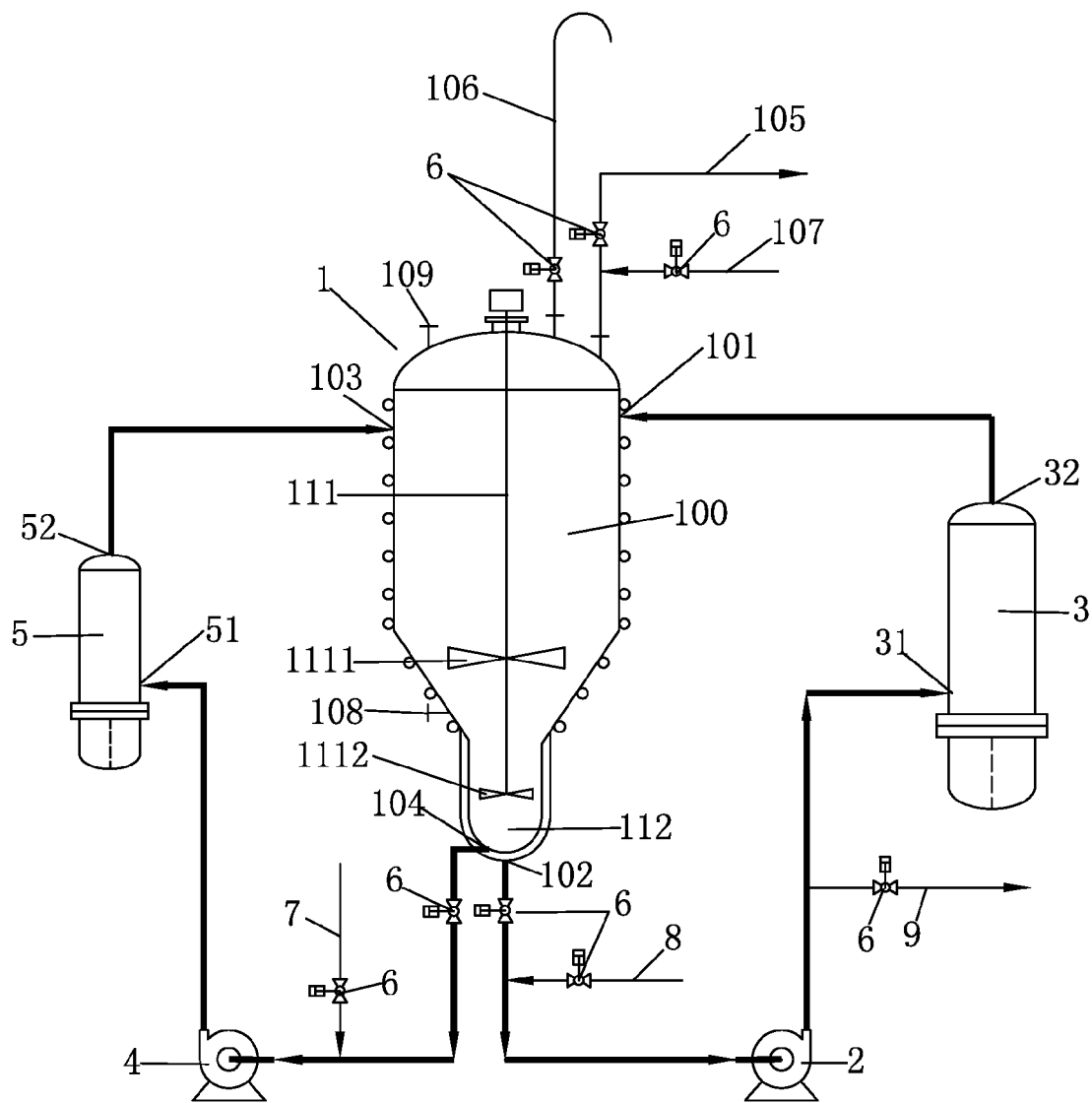
FIG. 1 shows the structure schematic view of the present invention.

With the following description of the drawings and specific embodiments, the invention shall be further described in details.

In FIG. 1, a device for producing ethoxylation derivatives comprises:

A reactor 1;

A main circulation heat exchanger 3, comprising a first feed inlet 31 and a first feed outlet 32;

A main circulation pump 2;

An assistant circulation heat exchanger 5, comprises a second feed inlet 51 and a second feed outlet 52;

And an assistant circulation pump 4 with lower starting quantity than the said main circulation pump 2;

The reactor 1 comprises a main body 100, a main circulation feed inlet 101, a main circulation feed outlet 102, an assistant circulation feed inlet 103, an assistant circulation feed outlet 104, a vacuumizing pipe 105, an evacuation pipe 106, a nitrogen input pipe 107, a chain initial dose feed inlet 108, an ethylene oxide feed inlet 109 and a stirring device arranged in the reactor 1; a pre-reaction cavity 112 with smaller inner diameter than that of the main body 100 is extended from the bottom of the main body 100; the main circulation feed outlet 102 and the assistant circulation feed outlet 104 are both arranged at the bottom of the pre-reaction cavity 112 of the main body 100 of the reactor 1; the stirrer device comprises a stirring shaft 111 with a main stirring paddle 1111 and an assistant stirring paddle 1112, and the main stirring paddle 1111 is arranged in the main body 100 of the reactor 1, and the assistant stirring paddle 1112 is arranged in the pre-reaction cavity 112; automatic valves 6 are arranged on the vacuumizing pipe 105, the evacuation pipe 106, the nitrogen input pipe 107, the main circulation feed outlet 102 and the assistant circulation feed outlet 104 respectively;

The main circulation feed outlet 102 is communicated with the first feed inlet 31 of the main circulation heat exchanger 3 through the main circulation pump 2, and the first feed outlet 32 of the main circulation heat exchanger 3 is communicated with the main circulation feed inlet 101 of the reactor 1; the assistant circulation feed outlet 104 of the reactor 1 is communicated with the second feed inlet 51 of the assistant circulation heat exchanger 5 through the assistant circulation pump 4, and the second feed outlet 52 of the assistant circulation heat exchanger 5 is communicated with the assistant circulation feed inlet 103 of the reactor 1.

A catalyst inlet pipe 7 is arranged at the pipe between the assistant circulation feed outlet 104 of the reactor 1 and the assistant circulation pump 4, a neutralizer inlet pipe 8 is arranged at the pipe between the main circulation feed outlet 102 of the reactor 1 and the main circulation pump 2, a product outlet pipe 9 is arranged at the pipe between the main circulation pump 2 and the first feed inlet 31 of the main circulation heat exchanger, automatic valves 6 are arranged on the catalyst inlet pipe 7, the neutralizer inlet pipe 8 and the product outlet pipe 9 respectively.

The working process of the invention is as follow: the material flow direction is shown by the arrow in FIG. 1, (1) Chain initial dose is added into the reactor through the chain initial dose feed inlet 108 to reach the starting quantity of the assistant circulation pump 4, and then the assistant circulation pump 4 and the stirring device are started, catalyst is added into the reactor through the catalyst inlet pipe 7 to produce the initial product, and then ethylene oxide is added into the reactor at low rate through the ethylene oxide feed inlet 109 to produce the middle product, and then the main circulation pump 2 is started when the amount of the middle product gets to the starting quantity of the main circulation pump 2;

(2) The adding rate of ethylene oxide is enhanced to high rate and is kept until the reaction is over, and the neutralizer is added through the neutralizer inlet pipe 8, and then the final product is generated;

(3) During the working process of the main circulation pump 2 and the assistant circulation pump 4, the final product can be transferred to the tank yard through the product outlet pipe 9 after the sample is detected qualified.

The invention has been described with reference to the preferred embodiments mentioned above; therefore it cannot limit the reference implementation of the invention. It is obvious to a person skilled in the art that structural modification and changes can be carried out without leaving the scope of the claims hereinafter and the description above.

What is claimed is:

1. A device for producing ethoxylation derivatives, comprises:
   a reactor, comprising a main circulation feed inlet, a main circulation feed outlet at the bottom of the reactor, a vacuumizing pipe, an evacuation pipe, a nitrogen input pipe, a chain initial dose feed inlet, an ethylene oxide feed inlet and a stirring device arranged in the reactor, valves are arranged on the vacuumizing pipe, the evacuation pipe, the nitrogen input pipe and the main circulation feed outlet respectively;
   a main circulation heat exchanger, comprising a first feed inlet and a first feed outlet;
   and a main circulation pump;
   the main circulation feed outlet is communicated with the first feed inlet of the main circulation heat exchanger through the main circulation pump, the first feed outlet of the main circulation heat exchanger is communicated with the main circulation feed inlet of the reactor;
   wherein, an assistant circulation feed inlet is arranged on the reactor, and an assistant circulation feed outlet is arranged at the bottom of the reactor, and a valve is arranged at the assistant circulation feed outlet, and comprises:
   an assistant circulation heat exchanger, comprising a second feed inlet and a second feed outlet;
   and an assistant circulation pump with lower starting quantity than the said main circulation pump;
   the assistant circulation feed outlet of the reactor is communicated with the second feed inlet of the assistant circulation heat exchanger through the assistant circulation pump, and the second feed outlet of the assistant circulation heat exchanger is communicated with the assistant circulation feed inlet of the reactor.

2. A device for producing ethoxylation derivatives according to claim 1, wherein, the reactor comprises a main body, and a pre-reaction cavity with smaller inner diameter than that of the main body is extended from the bottom of the main body; the main circulation feed outlet and the assistant circulation feed outlet are both arranged at the bottom of the pre-reaction cavity.

3. A device for producing ethoxylation derivatives according to claim 2, wherein, the stirring device comprises a stirring shaft with a main stirring paddle and an assistant stirring paddle, and the main stirring paddle is arranged in the main body of the reactor, and the assistant stirring paddle is arranged in the pre-reaction cavity.

4. A device for producing ethoxylation derivatives according to claim 1, wherein, a catalyst inlet pipe with a valve is arranged at a pipe between the assistant circulation feed outlet of the reactor and the assistant circulation pump.

5. A device for producing ethoxylation derivatives according to claim 1, wherein, a neutralizer inlet pipe with a valve is arranged at a pipe between the main circulation feed outlet of the reactor and the main circulation pump.

6. A device for producing ethoxylation derivatives according to claim 1, wherein, a product outlet pipe with a valve is arranged at a pipe between the main circulation pump and the first feed inlet of the main circulation heat exchanger.

7. A device for producing ethoxylation derivatives according to claim 1, wherein, at least one automatic valve is employed in the device.

8. A device for producing ethoxylation derivatives according to claim 2, wherein, at least one automatic valve is employed in the device.

9. A device for producing ethoxylation derivatives according to claim 3, wherein, at least one automatic valve is employed in the device.

10. A device for producing ethoxylation derivatives according to claim 4, wherein, at least one automatic valve is employed in the device.

11. A device for producing ethoxylation derivatives according to claim 5, wherein, at least one automatic valve is employed in the device.

12. A device for producing ethoxylation derivatives according to claim 6, wherein, at least one automatic valve is employed in the device.

* * * * *